US012639887B2

(12) United States Patent
Yamamoto et al.

(10) Patent No.: US 12,639,887 B2
(45) Date of Patent: May 26, 2026

(54) VEHICLE SURROUNDING ENVIRONMENT DISPLAY APPARATUS AND METHOD FOR CONTROLLING VEHICLE SURROUNDING ENVIRONMENT DISPLAY APPARATUS

(71) Applicants: TOYOTA JIDOSHA KABUSHIKI KAISHA, Aichi (JP); DENSO CORPORATION, Aichi (JP)

(72) Inventors: Yuki Yamamoto, Toyota (JP); Masashi Yamazaki, Toyota (JP); Hideaki Furuse, Kariya (JP); Naoyuki Okada, Kariya (JP); Rie Habuta, Kariya (JP)

(73) Assignees: TOYOTA JIDOSHA KABUSHIKI KAISHA, Aichi (JP); DENSO CORPORATION, Aichi (JP)

( * ) Notice: Subject to any disclaimer, the term of this patent is extended or adjusted under 35 U.S.C. 154(b) by 0 days.

(21) Appl. No.: 19/097,861

(22) Filed: Apr. 2, 2025

(65) Prior Publication Data

US 2025/0322592 A1 Oct. 16, 2025

(30) Foreign Application Priority Data

Apr. 12, 2024 (JP) ................................. 2024-064554

(51) Int. Cl.
G06T 15/20 (2011.01)
B60R 1/27 (2022.01)
G06F 3/01 (2006.01)

(52) U.S. Cl.
CPC ................ G06T 15/20 (2013.01); B60R 1/27 (2022.01); G06F 3/013 (2013.01); B60R 2300/304 (2013.01); G06T 2200/24 (2013.01)

(58) Field of Classification Search
CPC ..... G06T 15/20; G06T 2200/24; G06F 3/013; B60R 1/27; B60R 2300/304
USPC .......................................................... 345/156
See application file for complete search history.

(56) References Cited

U.S. PATENT DOCUMENTS 10,810,966 B1 * 10/2020 Landgraf ............... H04N 7/188
2023/0415652 A1 * 12/2023 Wada ..................... H04N 23/90

FOREIGN PATENT DOCUMENTS

JP 2013-109505 A 6/2013

* cited by examiner

*Primary Examiner* — Mark Edwards
(74) *Attorney, Agent, or Firm* — HAUPTMAN HAM, LLP

(57) ABSTRACT

A vehicle surrounding environment display apparatus is provided with a first display device and a second display device. A host vehicle icon corresponding to a host vehicle and a detection display concerning an object around the host vehicle are each displayed, and the detection display is shown around the host vehicle icon so as to correspond to the position of the object relative to the host vehicle based on detection information of an external sensor. A user of the host vehicle can change the display range of a first image on the first display device and also change a display range of a second image on the second display device.

4 Claims, 6 Drawing Sheets

Fig.2

Please directly check the surroundings of the vehicle.

VEHICLE SURROUNDING ENVIRONMENT DISPLAY APPARATUS AND METHOD FOR CONTROLLING VEHICLE SURROUNDING ENVIRONMENT DISPLAY APPARATUS

CROSS-REFERENCE TO RELATED APPLICATIONS

This application is based upon and claims the benefit of priority from Japanese Patent Application No. 2024-064554, filed on Apr. 12, 2024, the entire contents of which are incorporated herein by reference.

TECHNICAL FIELD

The present disclosure relates to a vehicle surrounding environment display apparatus and a method for controlling the vehicle surrounding environment display apparatus.

BACKGROUND

In the related art, Japanese Unexamined Patent Application Publication No. 2013-109505 is known as a technical document related to a vehicle surrounding environment display apparatus. This publication discloses an apparatus that displays a surrounding image of a vehicle captured by a peripheral monitoring camera on a display device of the vehicle. In this apparatus, if an intention of a driving operation by a driver of the vehicle is detected, the surrounding image is displayed in a reduced size on the vehicle's display device. Further, when the driver's driving operation is started, the surrounding image on the vehicle's display device is enlarged and displayed, and when the driver's driving operation ends, display of the surrounding image is terminated.

SUMMARY

Meanwhile, it has been considered that if another vehicle or the like approaches around a host vehicle, a detection display concerning the other vehicle is presented at a corresponding position on a surrounding monitoring image displayed on a display device. However, when a display range is changed by the user's operation or by an automated operation, there is a problem in that the detection display may be cut off from view.

According to one aspect of the present disclosure, there is provided a vehicle surrounding environment display apparatus including: a first display device that displays a first image corresponding to a surrounding environment of a host vehicle, and a second display device that displays a second image corresponding to the surrounding environment of the host vehicle. The first and second images are generated based on detection information of an external sensor of the host vehicle, the first image and the second image each display a host vehicle icon corresponding to the host vehicle and a detection display concerning an object around the host vehicle, and the detection display is shown around the host vehicle icon so as to correspond to a position of the object relative to the host vehicle based on the detection information of the external sensor. A display range of the first image on the first display device is changeable by an operation of a user of the host vehicle, and a display range of the second image on the second display device is changeable by an operation of the user. If the detection display is out of view from both the first display device and the second display device during display of the detection display, a change of the display range is performed so that the detection display appears on at least one of the first display device and the second display device.

In the vehicle surrounding environment display apparatus according to one aspect of the present disclosure, if the detection display is out of view from both the first display device and the second display device during display of the detection display, the display range may be changed so that the detection display appears on a display device for which the last operation record by the user is older among the first display device and the second display device.

In the vehicle surrounding environment display apparatus according to one aspect of the present disclosure, the apparatus may have a gaze detection unit configured to detect a gaze of the user. If the detection display is out of view from both the first display device and the second display device during display of the detection display, the display range may be changed so that the detection display appears on the display device among the first display device and the second display device that the user is not viewing.

Another aspect of the present disclosure provides a control method of a vehicle surrounding environment display apparatus that generates a first image and a second image corresponding to the surrounding environment of the host vehicle based on detection information of the external sensor of the host vehicle, and that includes a first display device presenting the first image and a second display device presenting the second image. The first and second images each display a host vehicle icon corresponding to the host vehicle and a detection display concerning an object around the host vehicle, and the detection display is shown around the host vehicle icon so as to correspond to a position of the object relative to the host vehicle based on the detection information of the external sensor. A display range of the first image on the first display device is changeable by an operation of the user of the host vehicle, and a display range of the second image on the second display device is changeable by an operation of the user. If the detection display is out of view from both the first display device and the second display device during display of the detection display, a change of the display range is performed so that the detection display appears on at least one of the first display device or the second display device.

According to each aspect of the present disclosure, it is possible to prevent a state in which the detection display is continuously cut off from view on both the first display device and the second display device.

BRIEF DESCRIPTION OF THE DRAWINGS

FIG. 2 is a diagram showing an example of display on a first display device and a second display device.

DETAILED DESCRIPTION

Hereinafter, embodiments of the present disclosure will be described with reference to the drawings.

Figure 1:
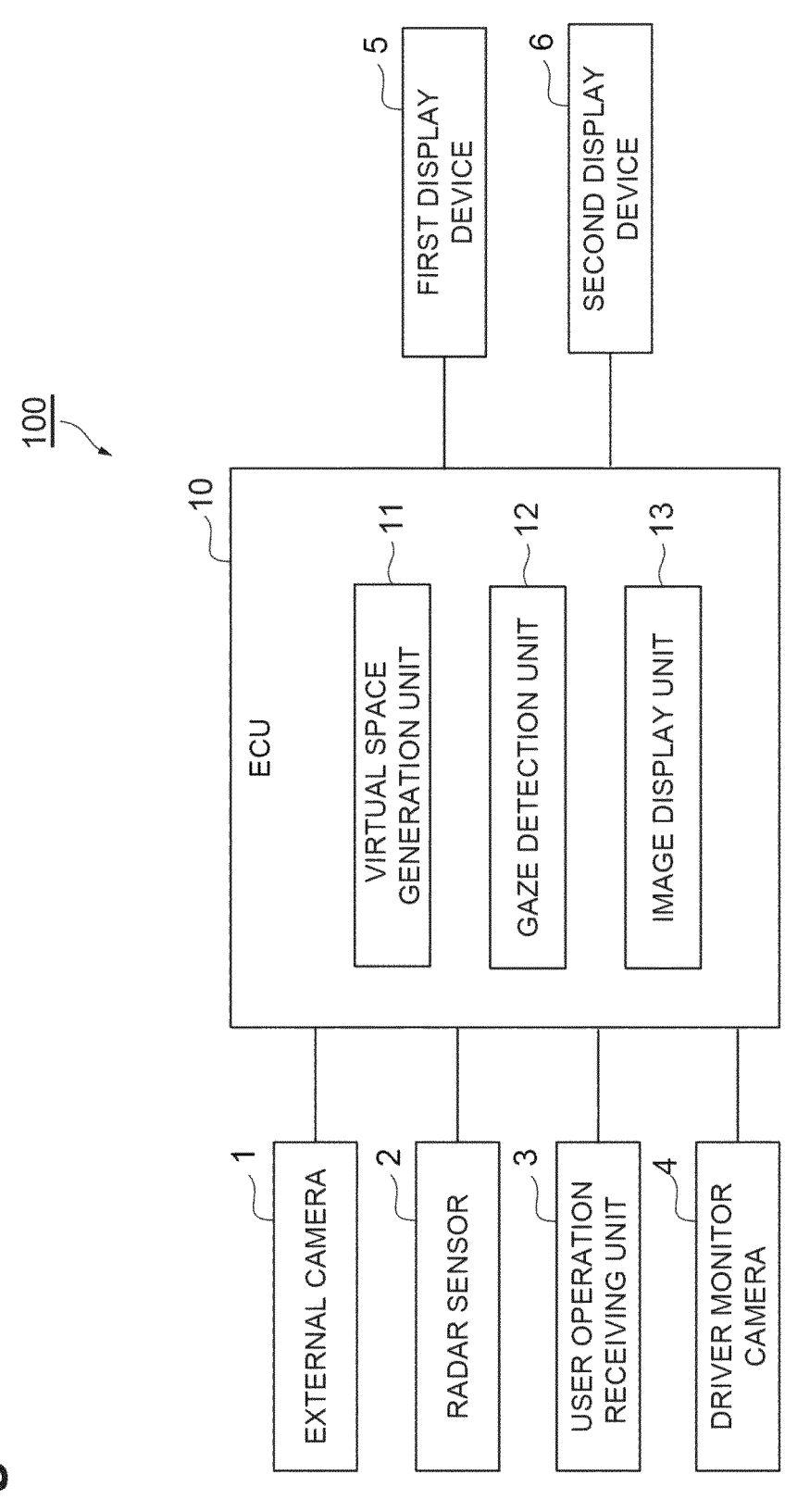
FIG. 1 is a block diagram showing a vehicle surrounding environment display apparatus according to one embodiment.

FIG. 1 is a block diagram showing a vehicle surrounding environment display apparatus 100 according to one embodiment. The vehicle surrounding environment display apparatus 100 shown in FIG. 1 is mounted on a vehicle such as a passenger car or a truck (hereinafter referred to as the "host vehicle") and is used to support a user's recognition of the surroundings of the vehicle. The vehicle surrounding environment display apparatus 100 generates a virtual space reflecting the surrounding environment of the host vehicle and displays, on a display device, an image of this virtual space as viewed from a virtual viewpoint that the user operates. The "virtual viewpoint" is a viewpoint the user manipulates within the virtual space. The vehicle surrounding environment display apparatus 100 displays, as a so-called 3D view, the surroundings of the host vehicle on the display device.

The user may be a driver of the host vehicle, an occupant of the host vehicle, or an owner of the host vehicle. The user may also be an operator of a remote support system that provides remote support for the host vehicle. In a remote support system, an external facility that is communicably connected to the host vehicle allows the operator to make judgments on traveling (going straight, turning, stopping, etc.) or driving operations of the host vehicle. During remote support, the operator is the user of the host vehicle. The host vehicle is not limited to a vehicle that can receive remote support by the remote support system. The host vehicle may or may not have an autonomous driving function.

[Configuration of Vehicle Surrounding Environment Display Apparatus]

As shown in FIG. 1, the vehicle surrounding environment display apparatus 100 includes an Electronic Control Unit (ECU) 10 that comprehensively manages the apparatus. The ECU 10 is an electronic control unit having a Central Processing Unit (CPU) and a storage unit. The storage unit is composed of, for example, a Read Only Memory (ROM), a Random Access Memory (RAM), an Electrically Erasable Programmable Read-Only Memory (EEPROM), or the like. In the ECU 10, for example, various functions are realized by having the CPU execute a program stored in the storage unit. The ECU 10 may be configured from a plurality of electronic units. The ECU 10 is connected to an external camera 1 (external sensor), a radar sensor 2 (external sensor), a user operation reception unit 3, a driver monitor camera 4, a first display device 5, and a second display device 6.

The external camera 1 is an imaging device that captures external conditions of the host vehicle. The external camera 1 may be configured to include, for example, a front camera that captures a front area of the host vehicle, a rear camera that captures a rear area of the host vehicle, and side cameras that capture left and right side areas of the host vehicle. The number of cameras constituting the external camera 1 is not particularly limited; only one may be used. The external camera 1 transmits captured image information to the ECU 10.

The radar sensor 2 is a detection device that detects objects around the host vehicle using radio waves (for example, millimeter waves) or light. The radar sensor 2 may include a millimeter wave radar or a LIDAR (Light Detection and Ranging). The radar sensor 2 transmits object detection information related to the detected object to the ECU 10. The radar sensor 2 and the external camera 1 together constitute external sensors for detecting the surrounding environment of the host vehicle. The object detection information from the radar sensor 2 or the captured image information from the external camera 1 corresponds to detection information of the external sensor.

The user operation reception unit 3 is a device that receives user operations for the virtual viewpoint. For example, the user operation reception unit 3 may be an input section of a Human Machine Interface (HMI) provided in the host vehicle. The input section may include, for example, a touch panel display, buttons, levers, switches, or the like. Alternatively, the user operation reception unit 3 may accept operations by voice recognition or gestures.

As the user operation reception unit 3, it is also possible to use an input device of a mobile terminal or a computer that is communicably connected to the host vehicle. It is also possible to use an operator terminal of a remote support system as the user operation reception unit 3.

The driver monitor camera 4 is a camera for capturing the driver, who is the user. The driver monitor camera 4 may be a digital camera having an imaging device such as a Charge Coupled Device (CCD) or a CMOS Image Sensor (CIS). The driver monitor camera 4 is provided, for example, on a steering column cover in front of the driver, and captures the head portion including the driver's face at a predetermined frame rate. The driver monitor camera 4 transmits a captured image of the driver to the ECU 10.

Note that the camera for capturing the user is not limited to the driver monitor camera, and may be an in-vehicle camera that captures an occupant in the vehicle interior. When the user is an operator who performs remote support, a camera provided to capture the operator on the operator side of the remote support system may be used. When the first display device 5 or the second display device 6 described below is a display of a portable computer, a camera mounted on the computer may be used.

The first display device 5 is an image display device for displaying image information to the user. The first display device 5 may be, for example, a center display mounted on a dashboard of the host vehicle. The first display device 5 may be a display device of a tablet-type computer installed at the front side of the passenger compartment of the host vehicle, or may be a Head Up Display (HUD). The first display device 5 may be an operator display of a remote support system provided in a facility away from the host vehicle. The first display device 5 may be a display of a portable terminal carried by the user, or may be a display of the user's tablet-type computer or desktop computer.

The second display device 6 is an image display device for displaying image information to the user. The second display device 6 may be integrated with the first display device 5. The first display device 5 and the second display device 6 may correspond to the respective divided screens in one image display device. The second display device 6 may be a display device separate from the first display device 5. Any of the selectable aspects described above for the first display device 5 may be applied as the second display device 6.

Next, a functional configuration of the ECU 10 will be described. As shown in FIG. 1, the ECU 10 includes a virtual space generation unit 11, a gaze detection unit 12, and an image display unit 13. Some of the functions of the ECU 10 described below may be executed by a server (for example, a server of a remote support system), a portable terminal, or a computer (for example, a tablet-type computer or a desktop computer) that is capable of communicating with the host vehicle.

The virtual space generation unit 11 generates a virtual space corresponding to the surrounding environment of the host vehicle, for example, based on the captured image information of the external camera 1. The surrounding environment of the host vehicle may include, for example, positions of lane lines of a lane in which the host vehicle travels. The surrounding environment of the host vehicle may also include states (positions, traveling directions, etc.) of other vehicles, such as a preceding vehicle or a vehicle traveling in an adjacent lane.

The virtual space is generated as a 3D image obtained by synthesizing a plurality of images, for example. The method for synthesizing the images is not particularly limited. The virtual space generation unit 11 may generate the virtual space as a 3D image by projecting each image onto a global coordinate system serving as a standard in the virtual space and associating overlapping pixels.

The virtual space generation unit 11 arranges a host vehicle icon corresponding to the host vehicle in the virtual space. The host vehicle icon is arranged as a three-dimensional icon of a vehicle shape. The host vehicle icon can be formed by polygons, voxels, or other computer graphics processing. The virtual space generation unit 11 may generate the host vehicle icon reflecting the state of the host vehicle. The virtual space generation unit 11 may reflect on/off states of the host vehicle's lamps (headlight, direction indicator light, brake lamp, etc.) in the on/off states of lamps of the host vehicle icon, and may reflect a steering angle of tires of the host vehicle in tires of the host vehicle icon. The shape and the size of the host vehicle icon are preset for each vehicle type.

When an object around the host vehicle is recognized based on the captured image information of the external camera 1, the virtual space generation unit 11 may arrange an object icon corresponding to the object in the virtual space. "Around the host vehicle" may be within a certain distance from the host vehicle, or may be within a range that can be detected by the external sensors of the host vehicle (the external camera 1 and the radar sensor 2). The object may include at least one of another vehicle, a pedestrian, a bicycle, a wall, a guardrail, a utility pole, a road sign, or a structure for construction. The object may also include a lane line or a road marking on the road.

The object icon may have the same shape as the actual object or may be an abstracted icon. The object icon may be a three-dimensional icon generated from the actual object based on the captured image information of the external camera 1. The object icon may also be an abstract icon registered in advance according to a type of the object. The type of the object includes, for example, a four-wheeled vehicle, a two-wheeled vehicle, a pedestrian, a bicycle, or a structure. The object icon may have different shapes for a large vehicle and an ordinary vehicle in the case of four-wheeled vehicles, or may have different shapes according to the vehicle type. Instead of using the captured image information of the external camera 1, the virtual space generation unit 11 may recognize the object based on the object detection information of the radar sensor 2, or may recognize the object by using both the external camera 1 and the radar sensor 2.

The virtual space generation unit 11 may arrange the object icon in the virtual space according to the position of the object in real space. The virtual space generation unit 11 arranges the object icon in the virtual space so as to correspond to the relative position of the object with respect to the host vehicle. In other words, the positional relationship between the host vehicle icon and the object icon in the virtual space corresponds to the positional relationship between the host vehicle and the object in real space.

Note that the virtual space generation unit 11 may recognize objects around the host vehicle by using information on the surrounding environment recognized by another vehicle through inter-vehicle communication. The virtual space generation unit 11 may communicate with, for example, a traffic information management server operated by a national authority to acquire camera image information installed on the road, various traffic information, and the like, and then recognize objects based on these.

The method for generating the virtual space is not limited to the method of synthesizing a plurality of images from the external camera 1. The virtual space generation unit 11 does not necessarily need to generate the virtual space as a 3D image as long as the user can recognize the surrounding environment of the host vehicle. The virtual space generation unit 11 may generate a digital virtual space by arranging the host vehicle icon, lane lines, and other vehicle icons so that the positional relationships of the lane lines and the other vehicles with respect to the host vehicle are recognizable, instead of generating an image.

The gaze detection unit 12 detects a gaze of the user (driver) based on a captured image of the driver taken by the driver monitor camera 4. If the user is not the driver, the gaze of the user is detected from a captured image taken by an appropriate camera. The gaze detection unit 12 determines whether or not the user is viewing the first display device 5 based on a detection result of the user's gaze and previously stored position information of the first display device 5. Also, the gaze detection unit 12 determines whether or not the user is viewing the second display device 6 based on a detection result of the user's gaze and previously stored position information of the second display device 6.

The image display unit 13 displays, on the first display device 5, a first image that is an image in the virtual space viewed from a first virtual viewpoint operated by the user in the virtual space generated by the virtual space generation unit 11. The image display unit 13 may set a position of the first virtual viewpoint in such a manner that the entire host vehicle icon M is displayed as an initial setting. The image display unit 13 changes the display range of the first image on the first display device 5 by moving the first virtual viewpoint in accordance with an operation of the user input to the user operation receiving unit 3.

Similarly, the image display unit 13 displays, on the second display device 6, a second image that is an image in the virtual space viewed from a second virtual viewpoint operated by the user in the virtual space generated by the virtual space generation unit 11. The image display unit 13 may set a position of the second virtual viewpoint in such a manner that the entire host vehicle icon M is displayed as an initial setting. The image display unit 13 changes the display range of the second image on the second display device 6 by moving the second virtual viewpoint in accordance with an operation of the user input to the user operation receiving unit 3.

The user operation receiving unit 3 may be a common input device for the first display device 5 and the second display device 6, or may be a different input device for each. If the input device is common, the operation target may be switched between the first display device 5 and the second display device 6. The second virtual viewpoint may have a restricted moving range or orientation compared with the first virtual viewpoint. The second virtual viewpoint may have its orientation restricted so as to look down from directly above the host vehicle icon.

Figure 2:
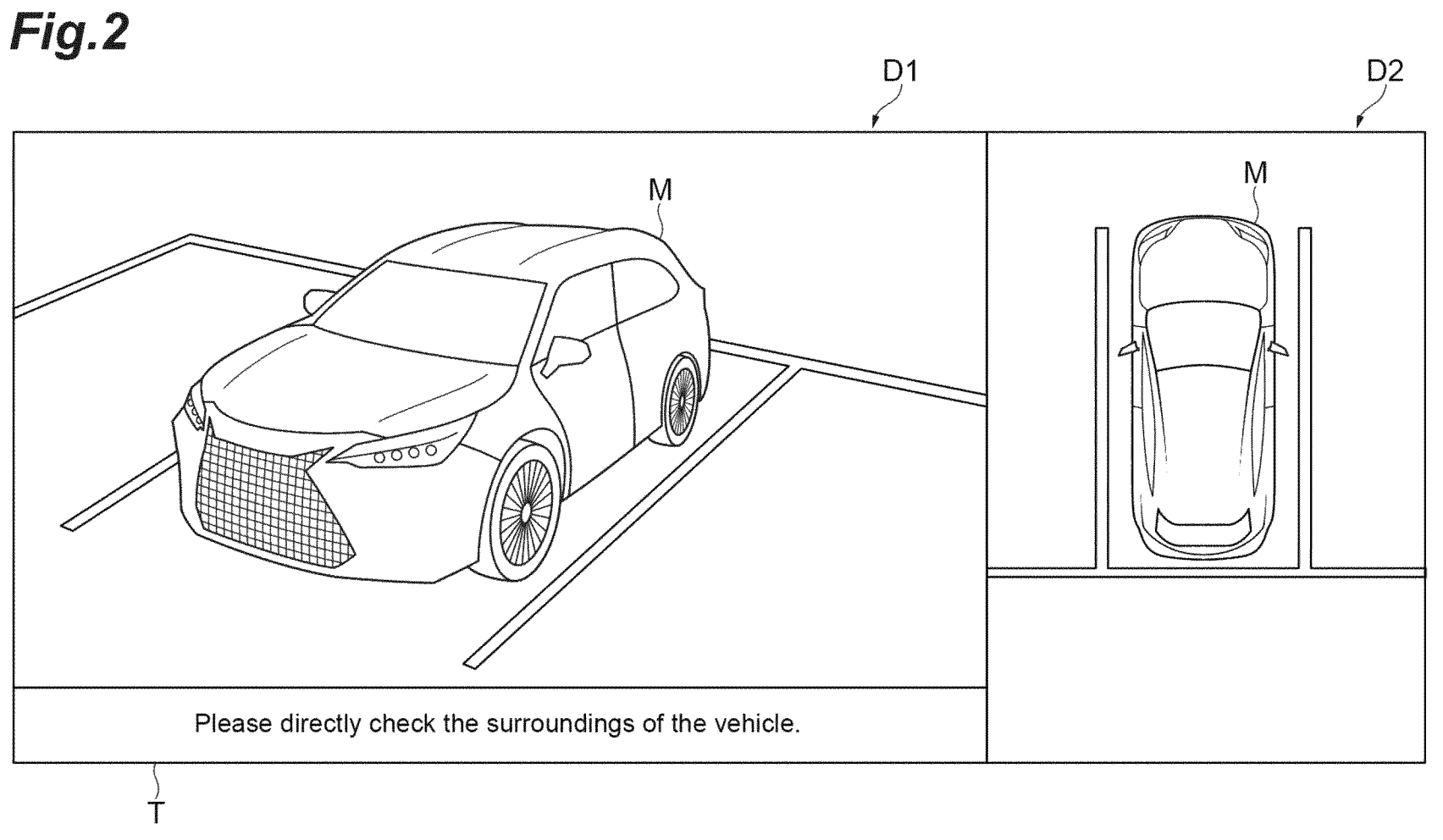

FIG. 2 is a diagram showing an example of displays of the first display device 5 and the second display device 6. Here, as an example, the first display device 5 and the second display device 6 are screens in a single center display device divided into two display areas. In FIG. 2, a first image D1 of the first display device 5 and a second image D2 of the second display device 6 are shown. In each of the first image D1 and the second image D2, the host vehicle icon M and lane lines are displayed. FIG. 2 shows a situation in which the host vehicle is parked in a parking lot. Also, there is a text field T at a lower portion of the first image D1 to notify the user, but the text field T is not essential.

The image display unit 13 displays, in the first image D1 and the second image D2, a detection display regarding an object around the host vehicle based on detection results of the external sensors. The detection display is a display for making the user notice an object around the host vehicle. The detection display is displayed around the host vehicle icon M so as to correspond to a position of the object relative to the host vehicle. For example, if a moving object (e.g., another vehicle or a pedestrian) is approaching the host vehicle, the image display unit 13 displays the detection display in a direction from which the moving object is approaching around the host vehicle icon M.

Figure 3:
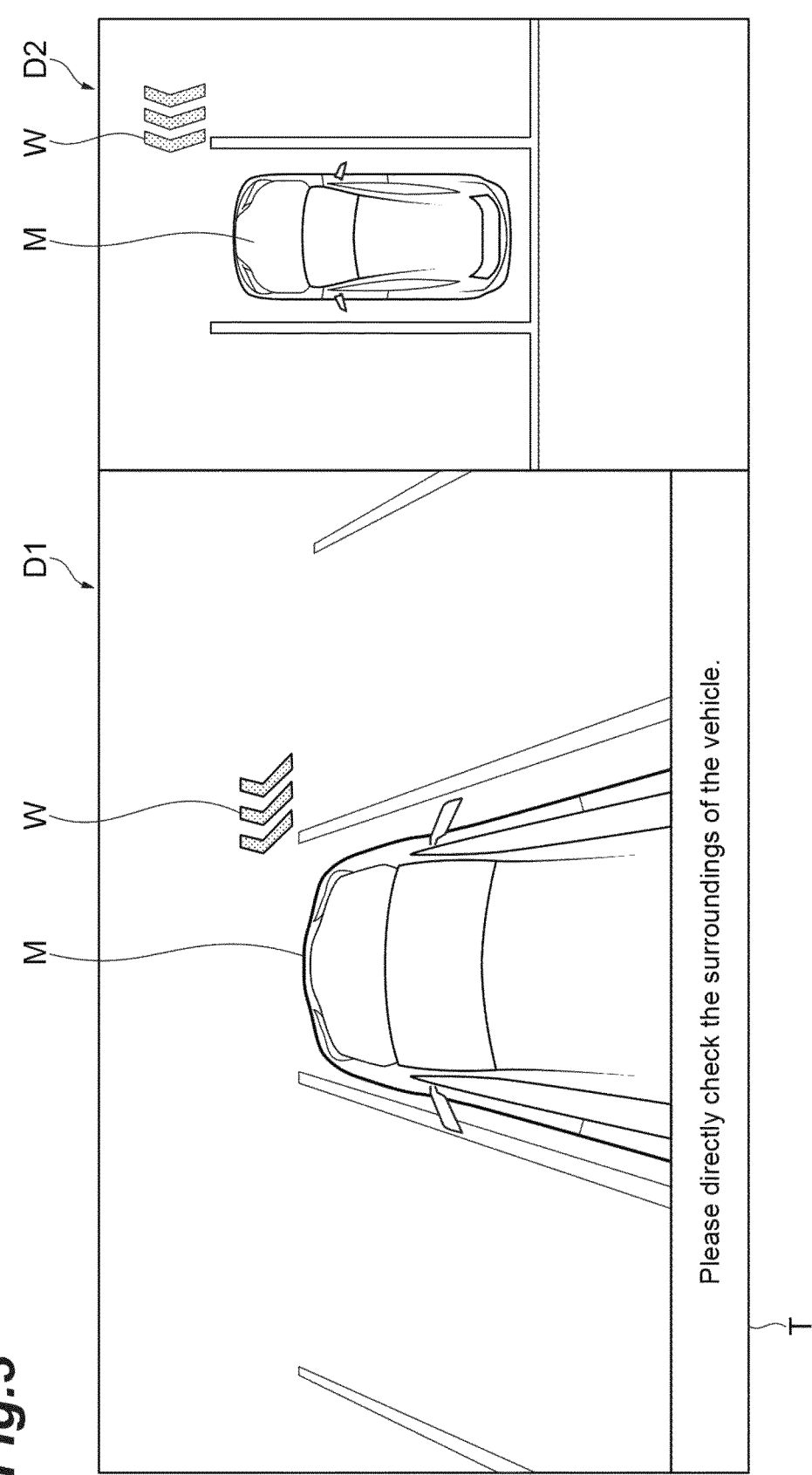
FIG. 3 is a diagram showing an example when a detection display appears.

Here, FIG. 3 is a diagram showing an example in a case where a detection display appears. In the first image D1 and the second image D2 of FIG. 3, a detection display W is shown. In each of the first image D1 and the second image D2, the host vehicle icon M corresponding to the host vehicle and the detection display W concerning an object around the host vehicle are displayed. The detection display W is, for example, a wedge-shaped display indicating that another vehicle is approaching from the right front of the host vehicle. Note that the shape of the detection display W is not limited to a wedge shape. The shape of the detection display W may be an arrow or some other shape, as long as it allows the user to notice the approaching moving object.

The detection display W may be displayed in a blinking manner or in a conspicuous color such as yellow or red. The detection display W may have different display shapes depending on the type of the approaching moving object. If the moving object is a pedestrian, it may be displayed by a pedestrian icon, or its blinking speed may be reduced in comparison to a case where the moving object is another vehicle. The detection display W may have different display aspects depending on an approach speed of the moving object. If the approach speed of the moving object is high, the detection display W may blink faster. Note that the detection display W may be generated in the virtual space by the virtual space generation unit 11 rather than being generated by the image display unit 13.

The image display unit 13, if the detection display W is out of view from both the first display device 5 and the second display device 6 during display of the detection display W, performs a change of the display range so that the detection display W appears on at least one of the first display device 5 or the second display device 6.

Figure 4:
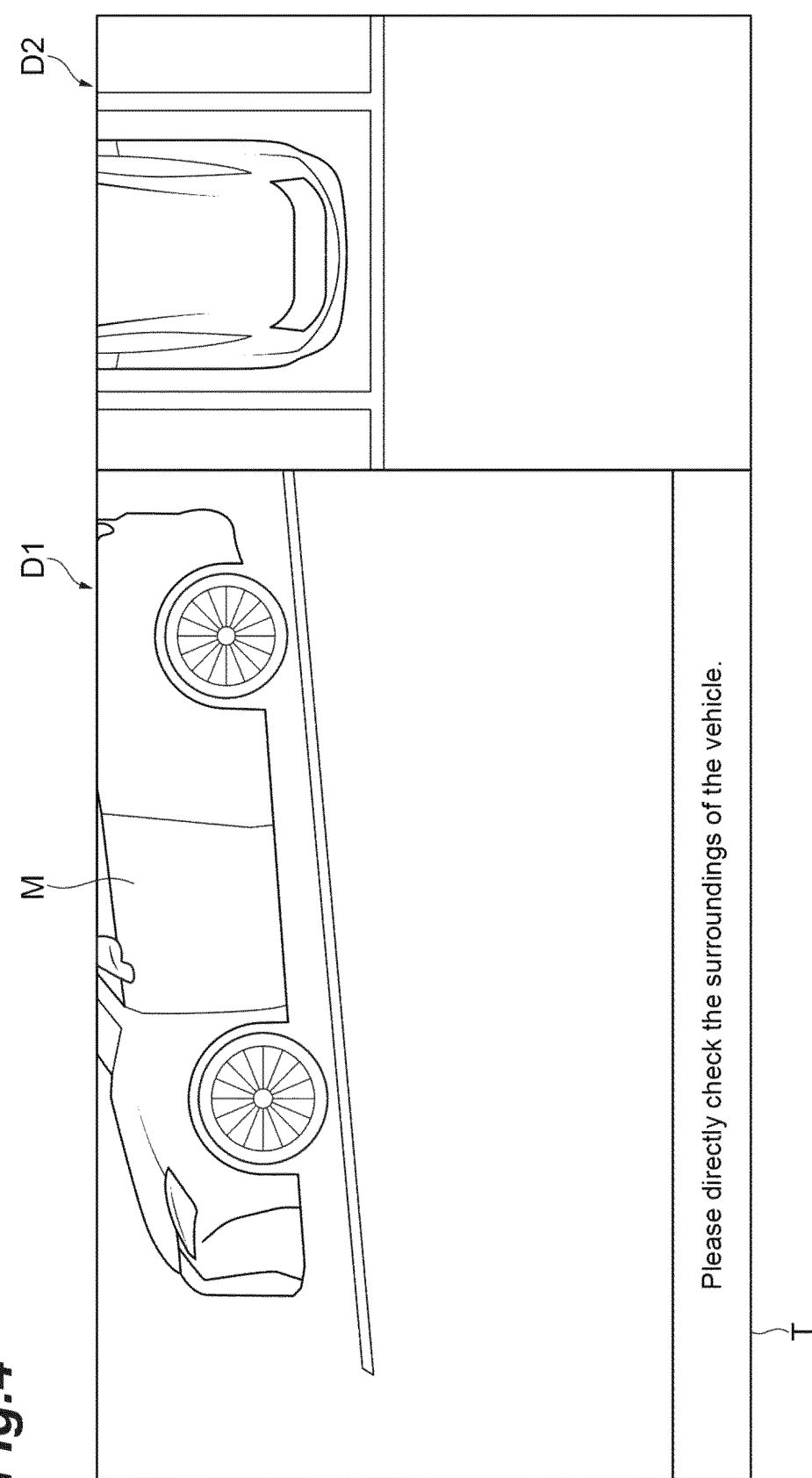
FIG. 4 is a diagram showing an example when the detection display is cut off from view.

"If the detection display W is out of view" refers to a state in which at least a part of the detection display W deviates from the display range of the first display device 5. It is also possible to define "if the detection display W is out of view" as a case in which the entire detection display W deviates from the display range. FIG. 4 is a diagram showing an example in a case where the detection display W is out of view. In FIG. 4, the first virtual viewpoint for the first image D1 has been operated by the user so as to view the host vehicle icon M from the left side, and the second virtual viewpoint for the second image D2 has been operated so that only the rear portion of the host vehicle icon M is shown.

Hence, in FIG. 4, the detection display W in the right front of the host vehicle icon M is not shown on either of the first display device 5 or the second display device 6.

As shown in FIG. 4, if the detection display W is out of view from both the first display device 5 and the second display device 6, the image display unit 13 determines, based on a result detected by the gaze detection unit 12, whether the user is viewing either one of the first display device 5 and the second display device 6. If the user is viewing either one of the first display device 5 or the second display device 6, the image display unit 13 performs a change of the display range so that the detection display W appears on a display device that the user is not viewing. For instance, if the user is viewing the first display device 5, the image display unit 13 automatically changes the display range of the second display device 6 so that the detection display W appears. Alternatively, if the user is viewing the second display device 6, the image display unit 13 automatically changes the display range of the first display device 5 so that the detection display W appears.

Specifically, for instance, the image display unit 13 automatically moves the first virtual viewpoint or the second virtual viewpoint to an initial setting position, thereby changing the display range so that the detection display W appears. The image display unit 13 may move the first virtual viewpoint or the second virtual viewpoint automatically until the detection display W appears, regardless of the initial setting. The image display unit 13 may change the display range by directing the first virtual viewpoint or the second virtual viewpoint toward the host vehicle icon M and then moving the first virtual viewpoint or the second virtual viewpoint away from the host vehicle icon M until the detection display W appears.

If the gaze detection unit 12 determines, based on the detection result, that the user is viewing neither the first display device 5 nor the second display device 6, the image display unit 13 performs a change of the display range so that the detection display W appears on the display device for which the user's last operation record is older among the first display device 5 and the second display device 6. The "display device for which the user's last operation record is older" means that the elapsed time from the date and time at which the user last performed an operation related to the display device is longer. The operation related to the display device may be limited to an operation that changes the display range of that display device.

If the user's last operation record for the first display device 5 is older, the image display unit 13 automatically changes the display range of the first display device 5 so that the detection display W appears. If the user's last operation record for the second display device 6 is older, the image display unit 13 automatically changes the display range of the second display device 6 so that the detection display W appears.

Figure 5:
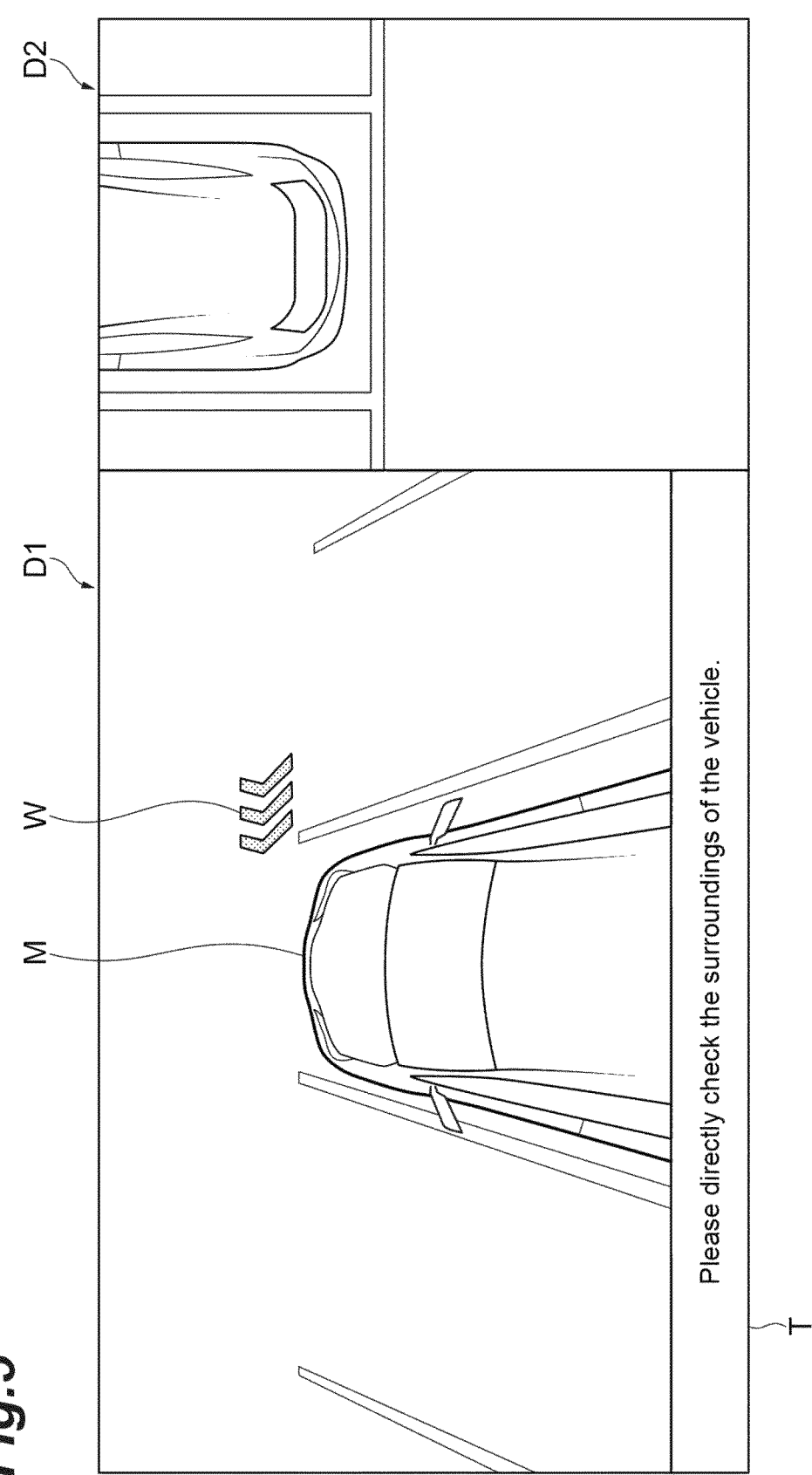
FIG. 5 is a diagram showing an example wherein out of view of the detection display is resolved.

FIG. 5 is a diagram showing an example in a case where the cutoff of the detection display W is resolved. In FIG. 5, because the user's last operation record was older for the first display device 5 or because the user is viewing the second display device 6, a change of the display range of the first display device 5 is performed so that the detection display W appears.

[Program]

A program causes the ECU 10 to function as the virtual space generation unit 11, the gaze detection unit 12, and the image display unit 13 described above. The program is provided by a non-temporary recording medium such as a ROM or a semiconductor memory. The program may also be provided via communication such as a network.

[Method for Controlling Vehicle Surrounding Environment Display Apparatus]

Figure 6:
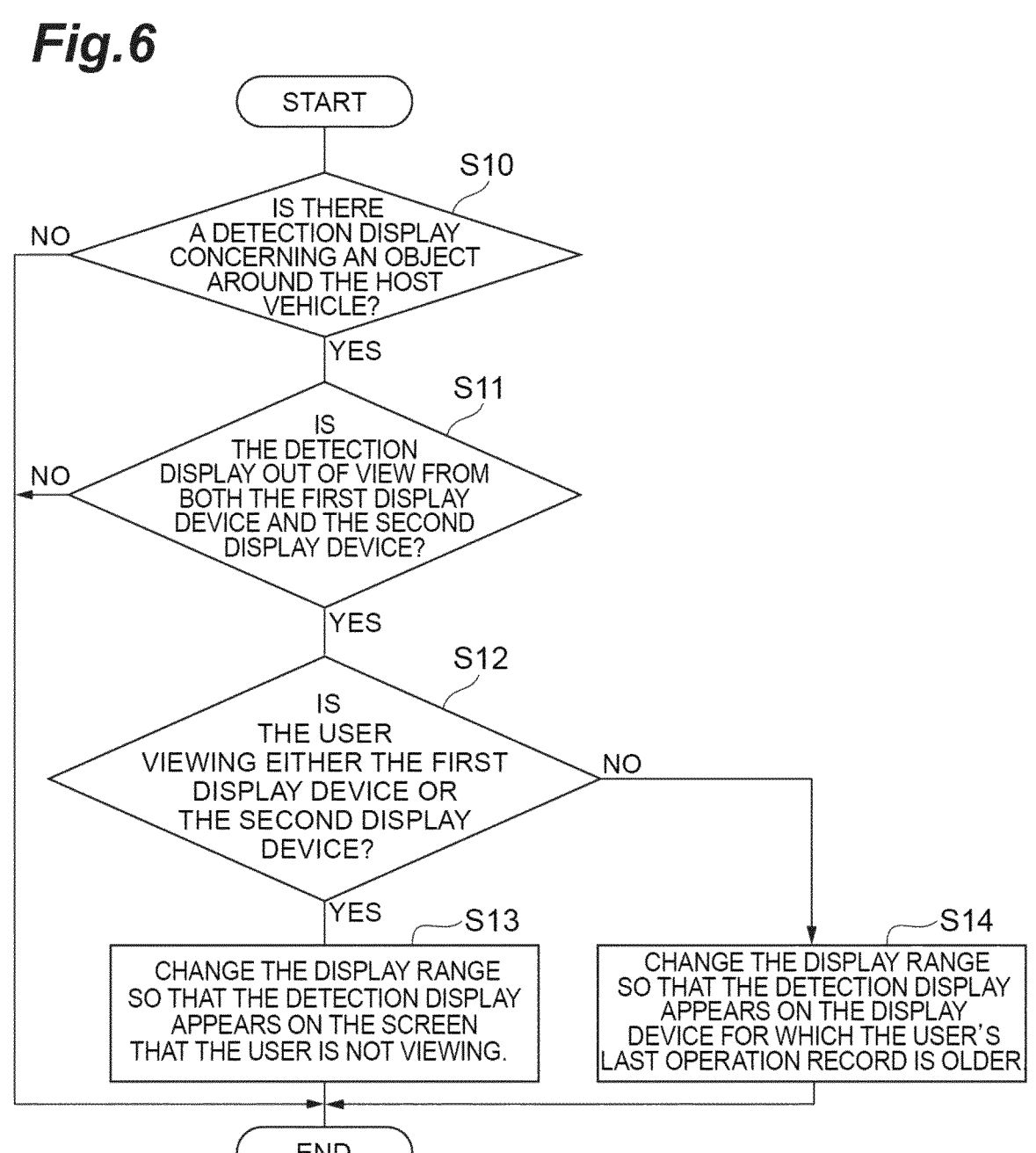
FIG. 6 is a flowchart illustrating an example of control for resolving cut-off of the detection display by the vehicle surrounding environment display apparatus.

Next, a method for controlling the vehicle surrounding environment display apparatus 100 according to the present embodiment will be described with reference to the drawings. FIG. 6 is a flow chart illustrating an example of a control method of the vehicle surrounding environment display apparatus 100.

As shown in FIG. 6, in S10, the ECU 10 of the vehicle surrounding environment display apparatus 100 determines whether there is a detection display W concerning an object around the host vehicle. If the ECU 10 determines that there is the detection display W (S10: YES), the process proceeds to S11. If the ECU 10 does not determine that there is the detection display W (S10: NO), the present process ends.

In S11, the ECU 10 determines whether the detection display W is out of view from both the first display device 5 and the second display device 6. If the ECU 10 determines that the detection display W is out of view from both the first display device 5 and the second display device 6 (S11: YES), the process proceeds to S12. If the ECU 10 does not determine that the detection display W is out of view from both the first display device 5 and the second display device 6 (S11: NO), the present process ends.

In S12, the ECU 10 determines whether the user is viewing either the first display 5 or the second display 6, or whether the user is not viewing any display. If the ECU 10 determines that the user is viewing either the first display 5 or the second display 6 (S12: YES), the process proceeds to S13. If the ECU 10 does not determine that the user is viewing either the first display 5 or the second display 6 (S12: NO), the process proceeds to S14. Not determining that the user is viewing either display means that the user is not viewing any display.

In S13, the ECU 10 performs a change of the display range so that the detection display W appears on the display device that the user is not viewing. For example, the image display unit 13 automatically moves the first virtual viewpoint or the second virtual viewpoint to the initial setting position, thereby changing the display range so that the detection display W appears. Then, the ECU 10 ends the present process.

In S14, the ECU 10 performs a change of the display range so that the detection display W appears on a display device for which the user's last operation record is older among the first display device 5 and the second display device 6. Then, the ECU 10 ends the present process.

According to the vehicle surrounding environment display apparatus 100 and the method for controlling the vehicle surrounding environment display apparatus 100 of the present embodiment described above, if the detection display W is out of view from both the first display device 5 and the second display device 6 during display of the detection display W, a change of the display range is performed so that the detection display W appears on at least one of the first display device 5 or the second display device 6, thereby suppressing a continued state in which the detection display W is out of view from both the first display device 5 and the second display device 6.

Moreover, in the vehicle surrounding environment display apparatus 100, if the detection display W is out of view, the apparatus changes the display range of the display device that the user is not viewing, so that it is possible to avoid causing inconvenience to the user by changing the display range of the display device the user is currently checking.

Also, in the vehicle surrounding environment display apparatus 100, if the detection display W is out of view, the apparatus changes the display range of the display device for which the user's last operation record is older, so that it is possible to avoid causing inconvenience to the user by changing the display range of the display device that the user is consciously checking.

While the embodiment of the present disclosure has been described above, the present disclosure is not limited to the above-described embodiment. The present disclosure can be carried out in various forms in which various modifications and improvements are made based on knowledge of those skilled in the art, including but not limited to the above-described embodiment.

The ECU 10 of the vehicle surrounding environment display apparatus 100 does not necessarily need to provide the gaze detection unit 12. The ECU 10 may select the display device whose display range is to be changed so that the detection display W appears, regardless of whether or not the user is viewing any display device. Also, the vehicle surrounding environment display apparatus 100 may select the display device whose display range is to be changed so that the detection display W appears, regardless of the oldness of the user's operation record.

The vehicle surrounding environment display apparatus 100 may include three or more display devices. Even if the vehicle surrounding environment display apparatus 100 includes three or more display devices, when the detection display W is out of view from both the first display device 5 and the second display device 6, the apparatus may change the display range of either the first display device 5 or the second display device 6. Alternatively, if the vehicle surrounding environment display apparatus 100 includes three or more display devices, when the detection display W is out of view from all of them, the apparatus may perform a change of the display range so that the detection display W appears on at least one of the display devices. In this case, the vehicle surrounding environment display apparatus 100 may give priority to changing the display range of the display device that the user is not viewing, or may give priority to changing the display range of the display device for which the user's last operation record is the oldest.

What is claimed is:

1. A vehicle surrounding environment display apparatus comprising:

a first display device configured to display a first image corresponding to a surrounding environment of a host vehicle and a second display device configured to display a second image corresponding to the surrounding environment of the host vehicle, the first image and the second image being generated based on detection information of an external sensor of the host vehicle;

wherein the first image and the second image each display a host vehicle icon corresponding to the host vehicle and a detection display concerning an object around the host vehicle;

wherein the detection display is shown around the host vehicle icon so as to correspond to a position of the object relative to the host vehicle based on the detection information of the external sensor;

wherein a virtual viewpoint of the first image on the first display device is changeable by an operation of a user of the host vehicle, and a virtual viewpoint of the second image on the second display device is changeable by an operation of the user; and wherein, if the detection display is out of view from both the first display device and the second display device during display of the detection display, a change of the virtual viewpoint is performed so that the detection display appears on at least one of the first display device and the second display device.

2. The vehicle surrounding environment display apparatus according to claim 1, wherein, if the detection display is out of view from both the first display device and the second display device during display of the detection display, the virtual viewpoint is changed so that the detection display appears on a display device for which the last operation record by the user is older among the first display device and the second display device.

3. The vehicle surrounding environment display apparatus according to claim 1, further comprising a gaze detection unit configured to detect a gaze of the user, wherein, if the detection display is out of view from both the first display device and the second display device during display of the detection display, the virtual viewpoint is changed so that the detection display appears on a display device among the first display device and the second display device that the user is not viewing.

4. A control method of a vehicle surrounding environment display apparatus comprising a first display device configured to display a first image corresponding to a surrounding environment of a host vehicle and a second display device configured to display a second image corresponding to the surrounding environment of the host vehicle, the first image and the second image being generated based on detection information of an external sensor of the host vehicle, the method comprising:

displaying, in the first image and the second image, a host vehicle icon corresponding to the host vehicle and a detection display concerning an object around the host vehicle;

showing the detection display around the host vehicle icon so as to correspond to a position of the object relative to the host vehicle based on the detection information of the external sensor;

enabling a virtual viewpoint of the first image on the first display device to be changed by an operation of a user of the host vehicle, and enabling a virtual viewpoint of the second image on the second display device to be changed by an operation of the user; and if the detection display is out of view from both the first display device and the second display device during display of the detection display, changing the virtual viewpoint so that the detection display appears on at least one of the first display device and the second display device.

* * * * *